(12) United States Patent
Whitfield

(10) Patent No.: US 7,520,478 B2
(45) Date of Patent: Apr. 21, 2009

(54) HOSE ATTACHMENT FOR SECURING A HOSE ADJACENT A SHAMPOO BOWL

(76) Inventor: Mariel G. Whitfield, P.O. Box 59, Noxapater, MS (US) 39346

( * ) Notice: Subject to any disclaimer, the term of this patent is extended or adjusted under 35 U.S.C. 154(b) by 317 days.

(21) Appl. No.: 11/163,659

(22) Filed: Mar. 6, 2006

(65) Prior Publication Data
US 2007/0205336 A1 Sep. 6, 2007

(51) Int. Cl.
A62C 13/76 (2006.01)
(52) U.S. Cl. ............................................. 248/75; 4/570
(58) Field of Classification Search .................. 248/75, 248/79, 82, 65, 74.1, 74.2; 4/570
See application file for complete search history.

(56) References Cited

U.S. PATENT DOCUMENTS

| | | | |
|---|---|---|---|
| 2,797,886 A * | 7/1957 | Pinckney .................... | 248/113 |
| 3,826,454 A | 7/1974 | Zieger | |
| 3,865,310 A | 2/1975 | Elkins et al. | |
| 4,174,822 A | 11/1979 | Larsson | |
| 4,719,654 A | 1/1988 | Blessing | |
| 5,632,049 A | 5/1997 | Chen | |
| 5,896,720 A * | 4/1999 | Bond ........................... | 52/698 |
| 6,109,569 A * | 8/2000 | Sakaida ....................... | 248/75 |
| 6,276,003 B1 | 8/2001 | Knapp | |
| 6,671,896 B2 | 1/2004 | Tse | |
| 2004/0232286 A1* | 11/2004 | Newkirk et al. ............. | 248/68.1 |
| 2005/0098688 A1* | 5/2005 | Miarka et al. .............. | 248/68.1 |
| 2006/0180718 A1* | 8/2006 | Harrison, Jr. ............... | 248/74.2 |

* cited by examiner

Primary Examiner—Ramon O Ramirez
(74) Attorney, Agent, or Firm—Theresa M. Seal

(57) ABSTRACT

A hose attachment for securing a water hose in position adjacent and against a shampoo bowl of a salon sink at a beauty salon so that a pre-set water pressure and temperature can be maintained without interruption throughout the various steps, such as soaping, shampooing, conditioning and rinsing, of the hair styling procedure for a client's hair includes a bracket securable to a wall adjacent the shampoo bowl and having at least one clamp projecting therefrom, with the clamp including a pair of semi-circular flexible gripping arms for receiving and holding the water hose and thereby freeing the stylist's hands for performing the various steps, and the clamp or clamps being oriented vertically or horizontally with respect to the counter top of the salon sink and also capable of rotation on the bracket for adjustably positioning and securing the water hose in place against the shampoo bowl.

2 Claims, 6 Drawing Sheets

HOSE ATTACHMENT FOR SECURING A HOSE ADJACENT A SHAMPOO BOWL

The present invention pertains to brackets and holders for water supply line pipes and hoses, and more particularly pertains to a device for holding a salon water hose adjacent a shampoo bowl of a hair salon or beautician's parlor.

BACKGROUND OF THE INVENTION

Attachments, holders and mounts for water lines, conduits, and hoses are common in business, commercial and residential applications. Among the most common and familiar types are mounts and holders for the showerheads of shower hoses. Mounts, holders and attachments may also be specialized for particular uses in particular professions. For example, in the salon and beauty business, flexible water hoses are used to wet, shampoo, lather, condition and rinse the client's hair as part of the styling process. Prior to performing each of the aforementioned actions involved in the hair or beauty styling process, the water temperature and pressure is first set by the stylist, the client's hair is then wetted by the stylist or beautician, the water is turned off and then the stylist or beautician performs the given action. The stylist must then turn on the water, re-set the water pressure and temperature, pick up the water hose and wet the client's hair as appropriate prior to the next action, then turn the water hose off or simply let the water run in the sink, and perform that action. This stop and go cycle of turning the water on and then turning the water off may be repeated three or four times throughout the hair styling procedure. The stylist's attention and hands are thus interrupted and diverted by having to adjust and maintain the desired water temperature and pressure and for manipulating the water hose so that it stays out of the way of the client and does not accidentally spill water on the shampoo sink, the stylist's implements and tools, or on the client. Thus, some type of mount or attachment for the shampoo hose would be desirable to both free the stylist's hands, shorten the client's appointment, and obviate or eliminate the aforedescribed standard stop and go hair styling cycle.

For example, the Zieger patent (U.S. Pat. No. 3,826,454) discloses an adjustable mounting arrangement for a showerhead that includes a wall-mounted bracket having a plurality of arcuate channels for receiving the hose coupling of the showerhead.

The Elkins et al. patent (U.S. Pat. No. 3,865,310) discloses a bracket assembly for a hand-held showerhead that includes a pair of hingable clamping arms for gripping the handle of the spray nozzle.

The Larsson patent (U.S. Pat. No. 4,174,822) discloses a shower holder that includes a bracket slidably and pivotably mounted to a bar with the bracket including a holding member for holding a shower handle.

The Blessing patent (U.S. Pat. No. 4,719,654) discloses a wall connection piece for a hand-held shower that includes a casing that is interconnected to a water main and a shower hose.

The Chen patent (U.S. Pat. No. 5,632,049) discloses a holder assembly for a showerhead that includes a positioning member slidably mounted on a vertical rod, and the positioning member includes a lever and a positioning ring for clamping onto and releasing the shower arm of the showerhead.

The Knapp patent (U.S. Pat. No. 6,276,003 B1) discloses an adjustable support for a shower that includes a rod on which a support bracket is mounted with the support bracket including a valve handle assembly for controlling fluid flow through a pair of showerheads mounted to respective shower holders secured above and below the support bracket.

The Tse patent (U.S. Pat. No. 6,671,896 B2) discloses a support for a hand-held showerhead that includes an elongated rod having a support bracket mounted at one end and a shower holder mounted at the opposite end with the support bracket for releasably receiving the conduit of the showerhead and the shower holder for holder the showerhead.

Nonetheless, despite the ingenuity of the above devices, there remains a need for a salon water hose bracket, attachment or holder that allows a beautician or stylist to pre-set the water pressure and temperature so that water can flow from the water hose without interruption and thereby freeing the stylist's hands throughout the steps of the hair styling process that include lathering, shampooing, conditioning, and rinsing.

SUMMARY OF THE INVENTION

The present invention comprehends a hose attachment, holder or mount for holding a water conduit or hose in place and position so that another activity or procedure, used in conjunction with the water hose, can be undertaken without having to move or reposition the water hose, repeatedly readjust the water flow and temperature, and repeatedly stop and start the water, thereby allowing the activity or procedure to be undertaken without such interruptions. More specifically, the present invention comprehends a hose attachment or device for holding and securing in position a water hose that is used in conjunction with a shampoo bowl at a beauty salon or parlor during the hair cutting and styling process that includes the steps or procedures of shampooing, lathering, rinsing and conditioning a client's hair.

The present invention includes a bracket securable to a wall in the beauty salon that is adjacent to the shampoo bowl, and other bowls that can include hot and cold sinks and accompanying faucets. The bracket includes a wall mounting surface and an opposite exterior surface. The bracket is mounted to the wall by fasteners that can include one or two pairs of screws or bolts, such as toggle bolts or expansion bolts. Mounted to and projecting from the bracket is at least one gripping member or clamp for holding the water hose in position during the various aforementioned steps of the hair cutting and styling process. The clamp includes a pair of semi-circular arms or grippers that are slightly spaced from each other at their respective distal ends to allow for the insertion of the water hose therein and between the arms. The arms are flexible to facilitate the insertion and removal of the water hose therebetween, and are therefore of a flexible and durable rubber composition.

The clamp or clamps can be oriented vertically or horizontally with respect to the salon sink, and to provide for maximum flexibility of use, the clamp(s) can rotatably mounted to the bracket by a stud on which the clamp would rotate so that the beautician or stylist can obtain a more precise positioning of the water hose with respect to the shampoo bowl.

It is an objective of the present invention to provide a device for holding a hose adjacent a shampoo bowl at a beauty salon that enables the beautician, stylist or shampooer to maintain continuous water flow through the hose throughout the shampooing and conditioning steps of the hair cutting and styling process.

It is another objective of the present invention to provide a device for holding a hose adjacent a shampoo bowl at a beauty salon that allows the stylist to set the water temperature and pressure and keep the hose turned on and secured adjacent the shampoo sink during the entire hair cutting and styling process that includes the steps of shampooing and conditioning.

It is still another objective of the present invention to provide a device for holding a hose adjacent the shampoo bowl at a beauty salon that saves the beautician, stylist or shampooer time by maintaining the appropriate water temperature and pressure throughout the steps of shampooing and conditioning thereby ensuring a comfortable experience for the client.

It is yet another objective of the present invention to provide a device for holding a hose adjacent the shampoo bowl at a beauty salon that leaves the stylist or beautician's hands free to soap and lather the client's hair by maintaining the hose in position adjacent the shampoo bowl.

It is still yet another objective of the present invention to provide a device for holding a hose adjacent the shampoo bowl at a beauty salon that allows for the easy mounting and dismounting of the hose and allows the hose to remain in position even when the water is turned off after any of the steps of the hair styling process.

Yet another objective of the present invention is to provide a device for holding a hose adjacent the shampoo bowl at a beauty salon wherein the beautician, stylist or shampooer can repeatedly lather and rinse, if desired, without having to stop and repeatedly adjust the water flow between each lather and rinse cycle.

Still another objective of the present invention is to provide a device for holding a hose adjacent the shampoo bowl at a beauty salon that obviates the need of the beautician, stylist or shampooer from leaving the hose lying in the sink during shampoo, lather, conditioning and rinse cycles.

Still yet another objective of the present invention is to provide a device for holding a hose adjacent the shampoo bowl at a beauty salon that eliminates the stop and go cycle wherein the beautician or stylist must start the water and then stop the water for each step of the hair cutting and styling process, and then repeat those actions at least three or four times for one client.

Still yet a further objective of the present invention is to provide a device for holding a hose adjacent the shampoo bowl at a beauty salon wherein the color of the gripping arms of the clamp can be made to match or fit the overall décor of the beauty salon.

A still further objective of the present invention is to provide a device for holding a hose adjacent the shampoo bowl at a beauty salon wherein the gripping arms of the clamp can be c-shaped or g-shaped.

These and other objects, features, and advantages will become apparent to those skilled in the art upon a perusal of the following detailed description read in conjunction with the accompanying drawing figures and appended claims.

DETAILED DESCRIPTION OF THE PREFERRED EMBODIMENT

Figure 1:
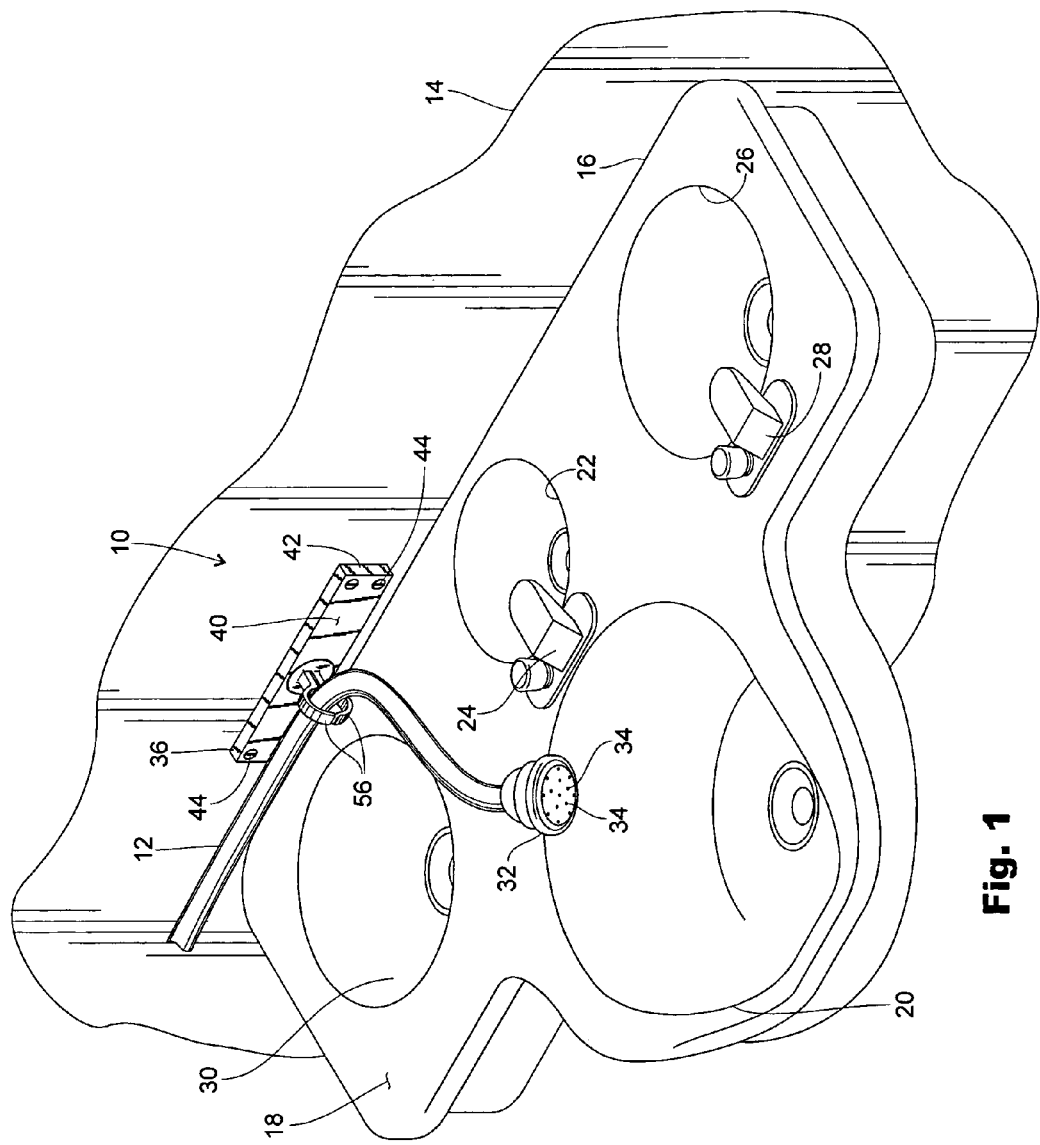
FIG. 1 is a perspective view of a device for holding a hose adjacent the shampoo bowl at a beauty salon with one vertically oriented clamp for holding the hose projecting from the wall-mounted bracket for holding the hose.
Figure 2:
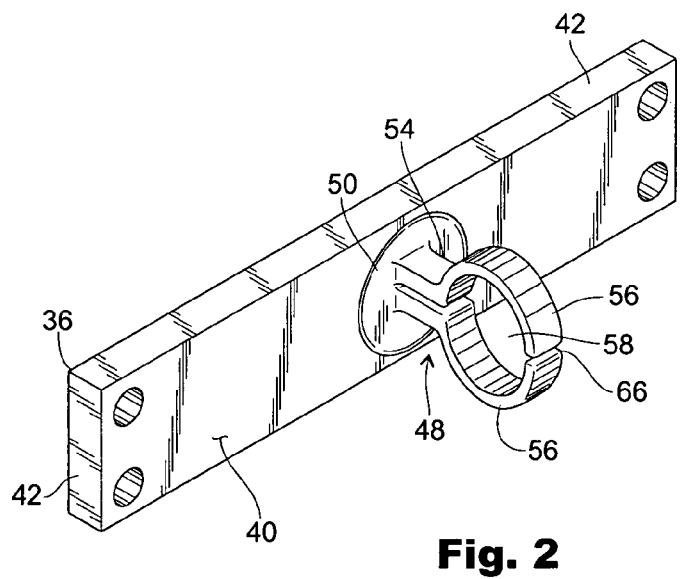
FIG. 2 is an enlarged perspective view of the device for holding the hose adjacent the shampoo bowl at the beauty salon illustrating the vertically oriented clamp projecting from the wall-mounted bracket.
Figure 3:
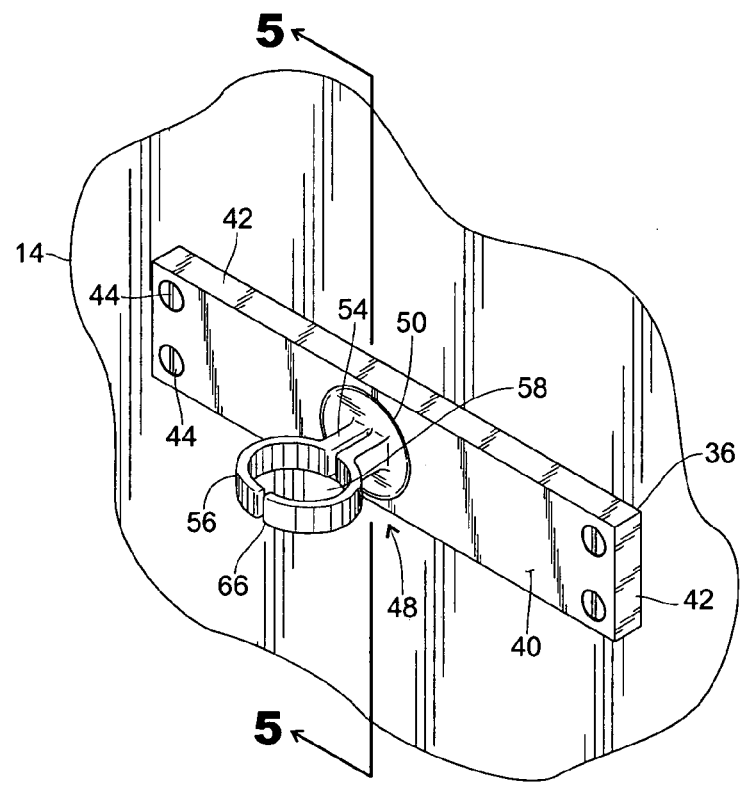
FIG. 3 is a perspective view of the device for holding the hose adjacent the shampoo bowl at the beauty salon illustrating the clamp projecting from the wall-mounted bracket in a horizontal orientation.
Figure 4:
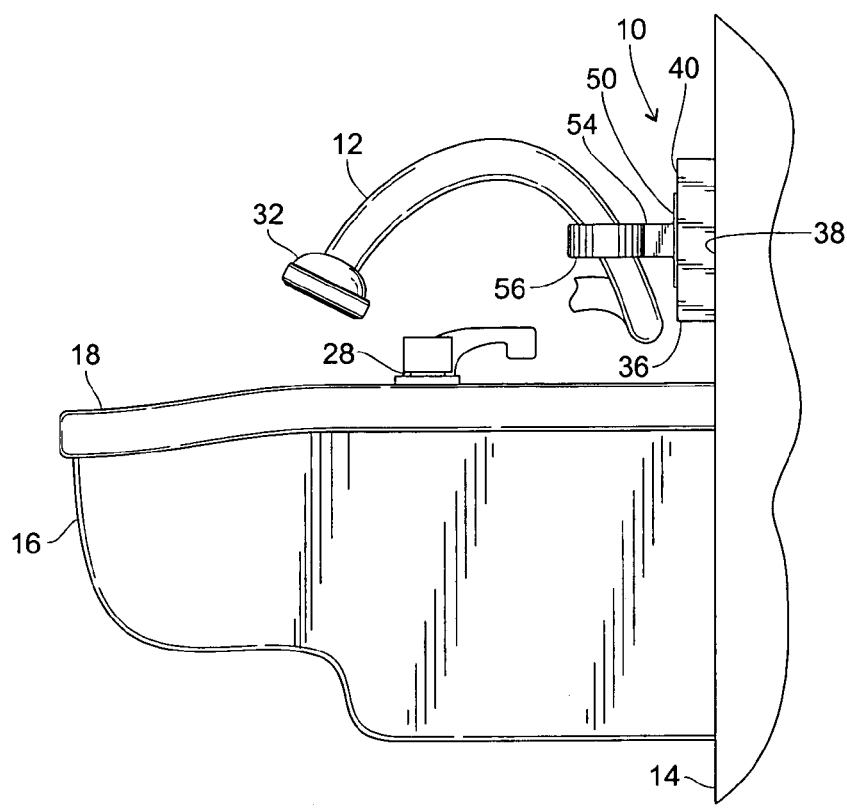
FIG. 4 is a side elevational view of the device for holding the hose adjacent the shampoo bowl at the beauty salon illustrating the hose being held by the clamp in the horizontal orientation.
Figure 5:
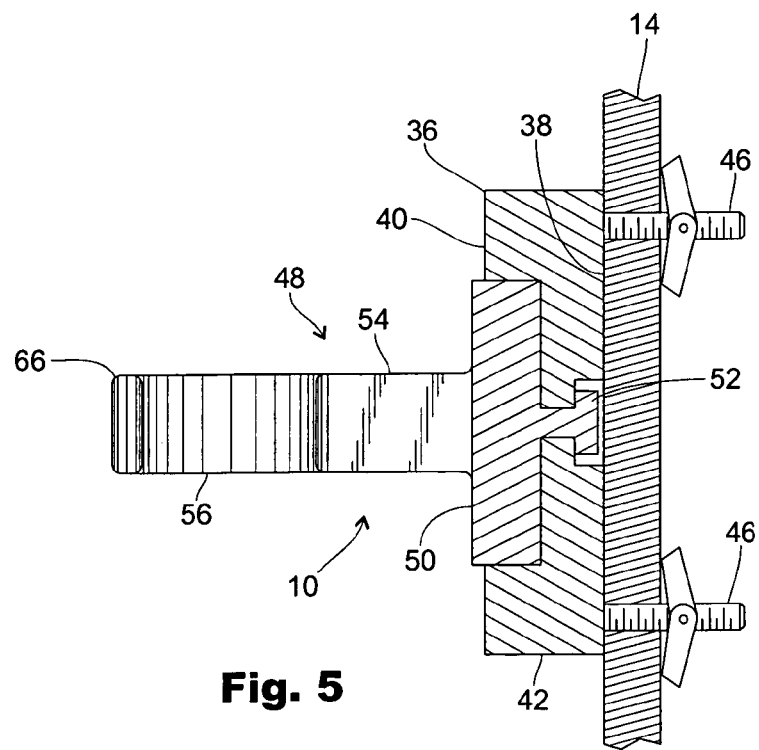
FIG. 5 is a sectioned elevational view of the device for holding the hose adjacent the shampoo bowl at the beauty salon taken along lines 5-5 of FIG. 3 illustrating the connection of the bracket to the wall and the attachment of the clamp in horizontal orientation to the bracket.

Illustrated in FIGS. 1-10 is a hose attachment, holder, mount or device 10 for holding and securing a water hose 12 in position while an individual or client is undergoing a hair cutting and styling process by a beautician or stylist at a beauty or hair salon. Beauty salons typically have at least one wall, such as the wall 14 shown in FIG. 1, divided up into a number of stations or areas with each stylist having one station or area that includes a swivel chair for the client and a salon sink 16. Cabinets and drawers contain all of the stylist's implements from scissors and blowers to gels and sprays. The shampoo sink 16 includes a flat counter top 18, a shampoo bowl 20, a hot receptacle 22 and an accompanying hot faucet 24, a cold receptacle 26 and an accompanying cold faucet 28, and an auxiliary receptacle 30. In addition, the stylist's station includes the flexible water hose 12 having a nozzle head 32 with apertures 34 for discharging hot and cold water during the various steps or procedures of the hair cutting process, with such steps or procedures including the soaping, lathering, shampooing, rinsing and conditioning of the client's hair. These steps occur with the client's head disposed over and partially into the shampoo bowl 20, and the stylist holding the water hose 12 adjacent the nozzle head 32 for spraying water onto the client's hair. However, because both of the stylist's hands must be free to perform the above described steps, prior to performing each step the stylist must turn off the water of the hose 12, set the water hose 12 aside or lay the hose 12 in the shampoo bowl 20, perform the step, and then readjust and re-set the water to the appropriate temperature and pressure for the next step. Perforce this necessitates that the stylist engage in a repetitive stop and go cycle that prolongs the hair appointment, inconveniences the client, and increases the chances of water spilling about the stylist's station because of the continuous stopping, adjusting, setting, starting and then stopping of the water from the water hose 12 both before and after each step. Thus, the present invention discloses a means to hold and secure the water hose 12 adjacent and against the inside of the shampoo bowl 20 so that the originally pre-set water can continue to flow, without interruption, throughout the hair cutting and styling process and thus eliminating the aforedescribed stop and go cycle.

Therefore, illustrated in FIGS. 1-10 is the hose attachment, holder, mount, fixture or device 10 for positioning and securing the water hose 12 adjacent and against the inside of the shampoo bowl 20 so that water from the hose 12 can flow into the shampoo bowl 20 thereby freeing the stylist's hands for other actions such as cutting, shampooing, rinsing, conditioning, and styling, etc. The hose attachment or device 10 includes a generally rectangular-shaped bracket 36 that is mounted to the wall 14 adjacent the salon sink 16. The bracket 36 defines a vertical plane that is spaced from vertical plane of the wall 14 when mounted thereto. The bracket 36 includes an interior mounting surface 38, an opposite external surface 40 and four adjoining and continuous peripheral sides 42. One pair of fasteners 44, and preferably two pairs of fasteners, is used to secure the bracket 36 to the wall 14. The fasteners 44 can be wood or metal screws or, as specifically shown in FIGS. 5 and 8, the fasteners are toggle bolts 46. A preferred dimension of the bracket 36 is for the bracket 36 to have a length of four inches. In addition, shampoo bowls are generally standardized in dimension with a standard diameter of the bowl being 19 inches.

Figure 6:
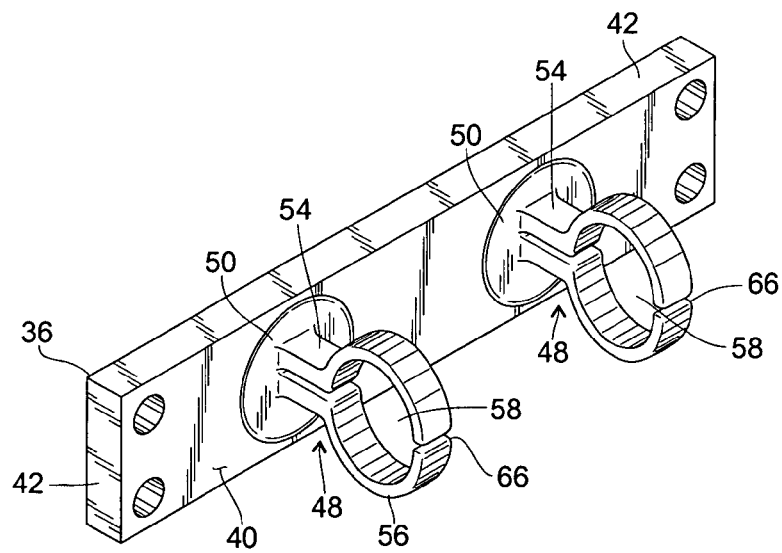
FIG. 6 is a perspective view of the device for holding the hose adjacent the shampoo bowl at the beauty salon illustrating two vertically oriented clamps projecting from the wall-mounted bracket.
Figure 7:
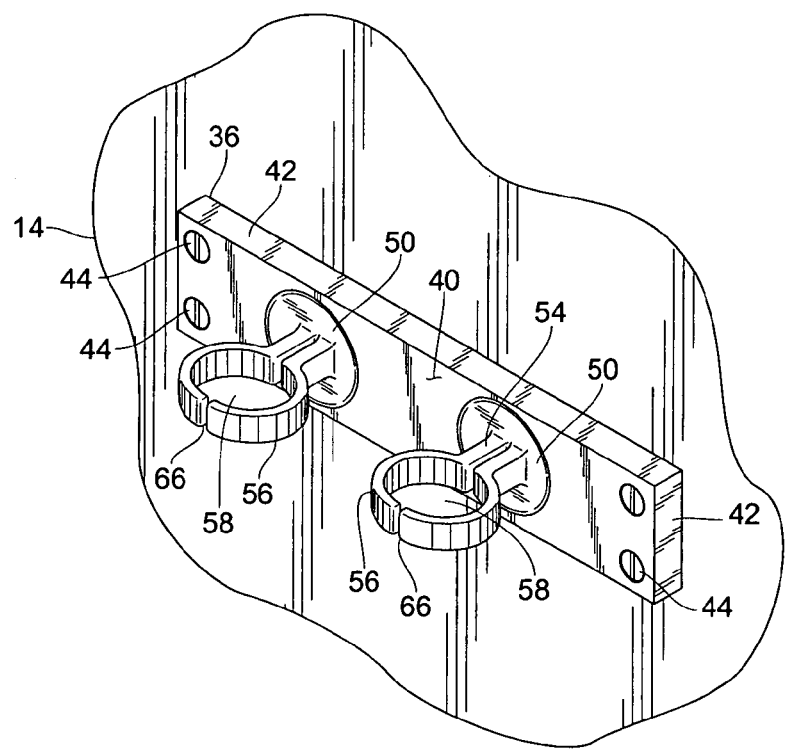
FIG. 7 is perspective view of the device for holding the hose adjacent the shampoo bowl at the beauty salon illustrating two horizontally oriented clamps projecting from the wall-mounted bracket.
Figure 8:
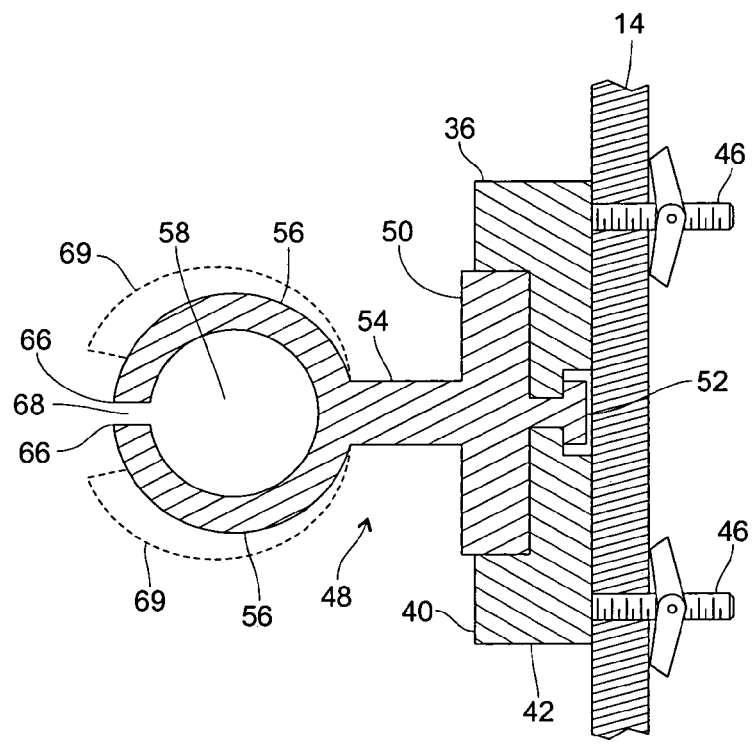
FIG. 8 is a sectioned side elevational view of the device for holding the hose adjacent the shampoo bowl at the beauty salon illustrating the flexure of the gripping arms of the clamp that is vertically oriented with respect to the wall-mounted bracket.
Figure 9:
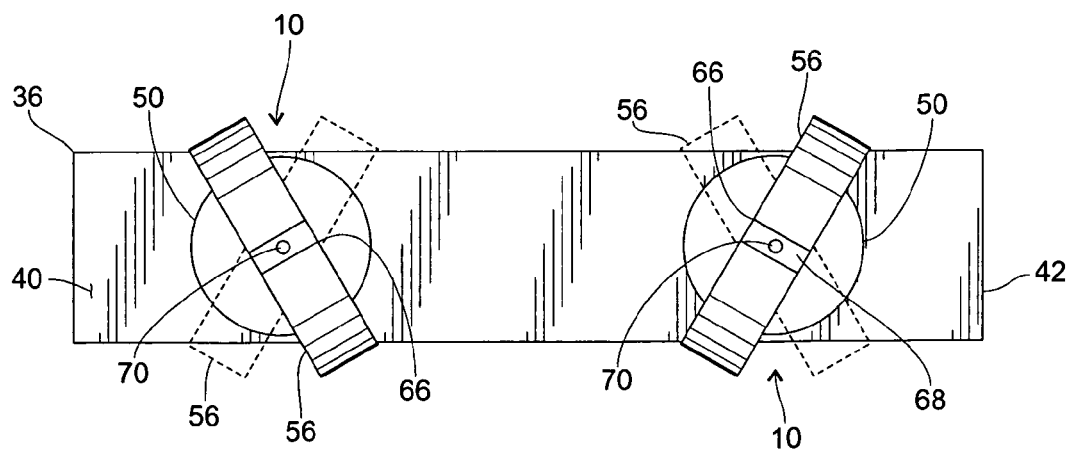
FIG. 9 is a front elevational view of the device for holding the hose adjacent the shampoo bowl at the beauty salon illustrating the adjustability of two clamps about a horizontal axis with respect to the wall-mounted bracket.
Figure 10:
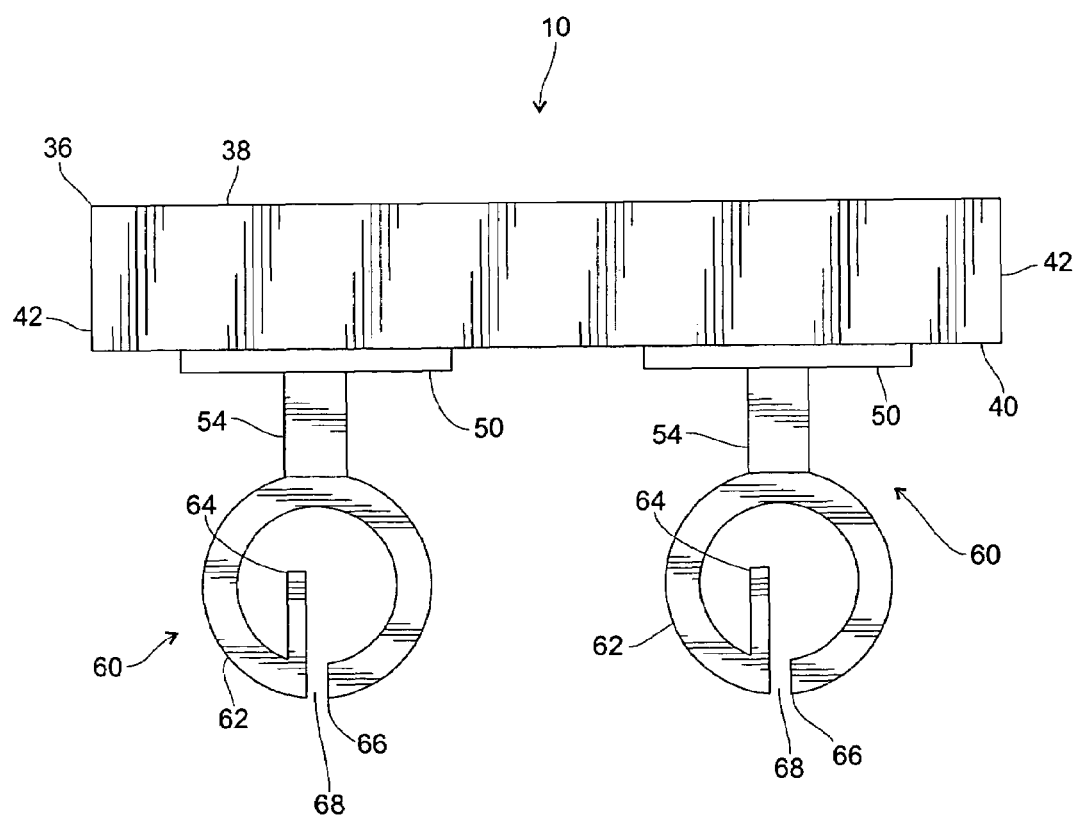
FIG. 10 is a top plan view of the device for holding the hose adjacent the shampoo bowl at the beauty salon illustrating two horizontally oriented clamps having g-shaped gripping arms.

Illustrated in FIGS. 1-9 is a gripping member or clamp 48 that projects a predetermined distance from the external surface 40 of the bracket 36 for holding the water hose 14 in position so that the nozzle head 32 can be disposed adjacent and against the shampoo bowl 20 so that the water continuously flows therein during the hair cutting and styling process. The clamps or gripping members 48 can be oriented vertically or horizontally with respect to the wall 14 of the salon sink 16, and can be either integrally affixed to the bracket 36 or mounted thereon as a separate structural member. For additional holding ability, two gripping members or clamps 48 can be mounted to the bracket 36 as shown in FIGS. 6, 7 and 9.

Each clamp 48 includes a generally cylindrical or disc-shaped attachment or mounting end 50 that abuts or can be infixed partially into the bracket 36 by means of an inwardly extending stud 52, a slender stem-like intermediate portion 54, and a pair of opposed semi-circular gripping portions, grippers, or arms 56 that extend outwardly from the bracket 36 approximately five and one half inches in the preferred embodiment. The gripping members or arms 56 are mirror structural elements of each other, and are preferably c-shaped as shown in FIGS. 1-9. The diameter of the clamps 54 is at least two and one half inches, and this distance measured from the bend of one arm 56 to the bend of the other semi-circular arm 56 forms the slot or opening 58 for receiving and holding the water hose 12. However, in FIG. 10 an alternative embodiment for a clamp 60 is shown having arms 62 forming a g-shape wherein one arm 62 includes an inwardly projecting portion 64 for simulating the g-shape.

As shown in FIGS. 2,3, 6-8, and 10, each clamp 48 and 60 includes a distal end 66, and the distal ends 66 of the clamps 48 and 60 are spaced slightly from each other thereby forming a gap or slot 68 to allow for the insertion therein of the water hose 12 and the removal therefrom when, for example, the beauty salon is closed for the day and all the implements must be put away and stored for the next day. The clamps 48 and 60 are composed of a durable and flexible rubber composition both to provide some resistance to the movement of the water hose 12 thereby helping to maintain the water hose 12 in position; and also to allow for the flexure of the arms 56 and 62 to facilitate the insertion and removal of the water hose 12. The flexure 69 of the arms 56 and 62 of the clamps 48 and 60 from the normal state outwardly for permitting the insertion or removal of the water hose 12 is shown in FIG. 8 for vertically oriented c-shaped clamp 48. The hose 12 is thus enclosed between the arms 56 of the clamp 48 and within the opening 56. The flexure 69 of the clamp 48 allows for the widening of the gap 68 between the distal ends 66 of the arms 56 in order to accommodate insertion of the water hose 12 past the distal ends 66 and into the opening 56 and removal therefrom. The flexure 69 of the arms 56 must accommodate the water hose 12 having an outside diameter of at least two inches. After the insertion or removal of the water hose 12, the arms 48 flex back to their normal state as also shown in FIG. 8.

The clamps 48 and 60, either a single clamp 48 and 60, or two clamps 48 and 60, can be orientated vertically with respect to the wall 14 of the beauty salon, as shown in FIGS. 1, 2, 6 and 8, or the clamps 48 and 60 can be oriented horizontally with respect to the wall 14 of the beauty salon, as shown in FIGS. 3-5, 7 and 10. Moreover, to provide for maximum adjustability of the clamps 48 and 60 so that the clamps 48 and 60 can receive and secure the water hose 12 against the shampoo bowl 20, the clamps 48 and 60 can be rotatably mounted to the bracket 36 as shown in FIG. 9 with specific reference to clamp 48. A rod or pin 70 would snugly extend through the bracket 36 and through the intermediate portion 54 of each clamp 48 and would thereby define an axis of rotation. The rotation of clamps 48 and 60 would be about a complete 360 degree circle, and FIG. 9 shows possible rotations of the clamps 48 on the axis defined by the rod 70 to provide for a more specific orientation for holding and securing the water hose 12. An inner head (not shown) of the pin or rod 70 would be wedged between the interior surface 38 of the bracket 36 and the wall 14 thereby providing some resistance to the rotation of the clamp 48, so that after a given amount of adjustable rotation, the clamp 48 will hold that position and will not be further moved by the weight or inadvertent movement of the water hose 12. In all of the above examples the use of the hose attachment or device 10 frees the stylist's hands for attending to the client's hair by securing the water hose 12 in position adjacent and against the shampoo bowl 20 thereby maintaining the initially pre-set temperature and pressure of the water throughout the hair cutting and styling process.

Although several embodiments of the invention have been set forth in detail, it is to be understood that numerous modifications, alterations, and variations are possible and practicable to those skilled in the art without departing from the spirit of the invention or the scope of the appended claims.

What is claimed is:

1. A hose attachment for securing a water hose adjacent and against a shampoo bowl of a beauty salon, comprising:
   a rectangular-shaped bracket for mounting to the wall of the beauty salon adjacent the shampoo bowl;
   the bracket including an interior surface for contiguous placement to the wall, an exterior surface and a continuous peripheral side;
   at least one clamp mounted to the exterior surface of the bracket and projecting toward the shampoo bowl;
   the clamp including a mounting end affixed to the bracket, an intermediate portion extending from the mounting end and a pair of flexible semi-circular arms projecting from the intermediate portion and spaced from the bracket by the intermediate portion;

the semi-circular arms forming an opening for receiving and holding therein the water hose;

each semi-circular arm having a distal end with the distal ends of the arms spaced from each other for defining a gap therebetween;

the distal ends of the arms of the clamp extending proximately five and one half inches from the bracket to allow for the appropriate positioning of the water hose adjacent the shampoo bowl; and whereupon the semi-circular arms flex outward to allow for the insertion and placement of to water hose within the opening and then the arms flex inward toward each other so that the water hose can be held within the arms and adjacent the shampoo bowl.

2. A hose attachment for securing a water hose adjacent and against a shampoo bowl of a beauty salon, comprising:

a rectangular-shaped bracket for mounting to the wall of the beauty salon adjacent the shampoo bowl;

the bracket including an interior surface for contiguous placement to the wall, an exterior surface and a continuous peripheral side;

at least one clamp mounted to the exterior surface of the bracket and projecting toward to shampoo bowl;

the clamp including a mounting end affixed to the bracket, an intermediate portion extending from to mounting end and a pair of flexible semi-circular arms projecting from the intermediate portion and spaced from the bracket by the intermediate portion;

the semi-circular arms forming an opening for receiving and holding therein the water hose;

each semi-circular arms having a distal end with the distal ends of the arms spaced from each other for defining a gap therebetween;

at least one of the semi-circular arms including an inwardly projecting portion so that the semi-circular arms form a g-shape for enclosing and holding the water hose;

the distance from the exterior surface of the bracket to the distal ends of the arms of the clamp being proximately five and one half inches to provide for the appropriate positioning of the water hose adjacent to the shampoo bowl; and whereupon the semi-circular arms flex outward to allow for the insertion and placement of the water hose within the opening of the clamp and then the arms flex inward toward each other so that the water hose can be held within the arms and adjacent to the shampoo bowl.

* * * * *